July 4, 1950 M. G. CROSBY 2,513,786

RECEIVER SYSTEM

Filed Feb. 14, 1945 3 Sheets-Sheet 1

INVENTOR.

MURRAY G. CROSBY.

BY H. S. Grover

ATTORNEY.

July 4, 1950 M. G. CROSBY 2,513,786

RECEIVER SYSTEM

Filed Feb. 14, 1945 3 Sheets-Sheet 2

INVENTOR.
MURRAY G. CROSBY.
BY H. S. Grover
ATTORNEY.

INVENTOR.
MURRAY G. CROSBY
BY H. S. Grover
ATTORNEY.

Patented July 4, 1950 2,513,786

UNITED STATES PATENT OFFICE 2,513,786

RECEIVER SYSTEM

Murray G. Crosby, Riverhead, N. Y., assignor to Radio Corporation of America, a corporation of Delaware Application February 14, 1945, Serial No. 577,902

1 Claim. (Cl. 250—20)

Figure 1:
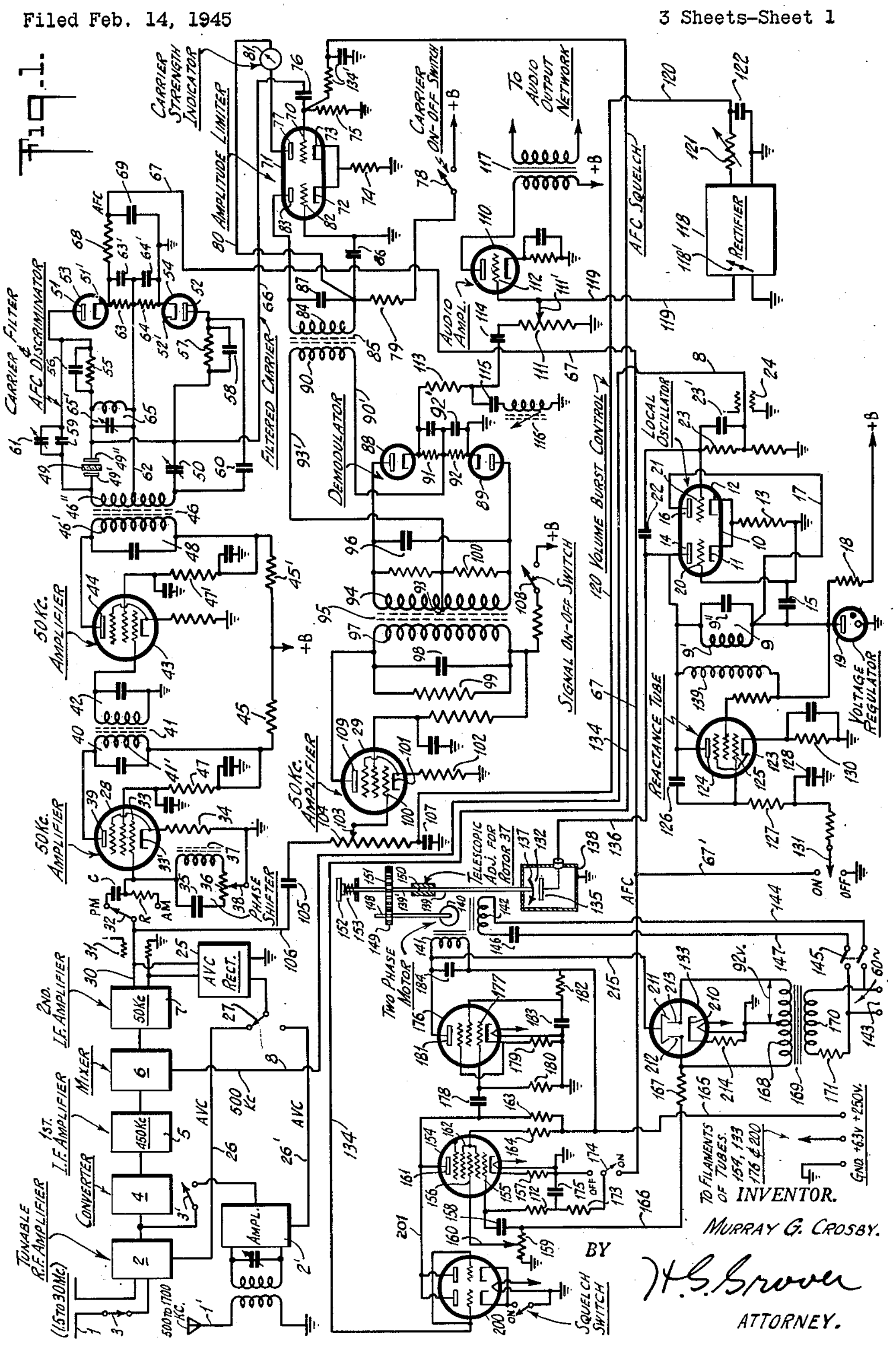

My present invention relates to amplitude modulated (AM) or phase modulated (PM) carrier wave receiver systems, and more particularly to a system for receiving AM or PM carrier waves with carrier exaltation.

Carrier-exalted reception should come into more and more general use in all wave bands in which multi-path fading distortion is encountered. This includes the present AM broadcast band of 550 to 1600 kilocycles (kc.) in which fading distortion is experienced in a region of about 50 to 100 miles from the transmitter due to interference between the sky wave and the ground wave. Such fading causes a cancellation of the carrier frequency, leaving the modulation sideband components to beat together thereby causing unintelligible distortion. Such distortion has been termed "selective fading" in the past, and it is a severe type of disortion. This form of distortion is responsible for the "fading wall" which limits the night-time coverage of a broadcast station in the 550 to 1600 kc. band. Carrier-exalted reception is very effective in removing this distortion. By the terms "carrier-exalted reception" and "carrier-exalted demodulation" are meant those forms of reception and demodulation wherein signal waves subject to selective fading have the relative strength of the carrier raised with respect to the modulation sideband components at the receiver.

Another wave band affected by multi-path distortion is the band from about 1.5 to about 30 megacycles (mc.). This band is used for point-to-point communication, or for short wave broadcast. The multiplicity of paths are caused by unequal numbers of ricochets of the signal between the ionosphere and the earth. The distortion that results is the same type that is experienced in AM broadcast reception, except that it is present at all times instead of just at night. Hence, carrier-exalted reception is more important in this band.

Having once applied carrier exaltation to an AM receiver, it is relatively simple to convert the receiver to a PM receiver. This can be done by inserting a 90° phase shifter in the filtered carrier circuit. Phase modulation then becomes the most economical transmission to use because of its advantages at the transmiter. For example, carrier-exalted PM reception would be advantageous in plane-to-ground communication where the band from 1.5 to 20 mc. is used, and where the decreased weight of the PM transmitter would be welcomed. In addition, the elimination of selective fading effects would be realized.

Furthermore, it has been found that in the presence of strong noise carrier-exalted reception generally gives a slightly improved reception. This improvement is apparently due to the elimination of beats between the individual noise components, the beats presumably being eliminated by the carrier exaltation. Carrier-exalted reception gives an improved signal to noise ratio in the presence of strong man-made noise of the impulse type. In the case of this latter type of noise, carrier-exalted reception appears to provide an elimination of low frequency noise components which improves the over-all character of reception.

It is one of the important objects of my present invention to provide a system for receiving AM or PM carrier waves in such a manner that the effects of selective carrier fading are very greatly reduced. This is generally accomplished by dividing the received signals into two paths, filtering and limiting the carrer in one path, and recombining in a predetermined manner the limited filtered signal with the unfiltered signal at the detector.

Another important object of this invention is to provide a superheterodyne receiving system, adapted to receive either AM or PM carrier waves, wherein an automatic frequency control (AFC) system having a high degree of control functions to maintain the intermediate frequency (I. F.) value at a predetermined center frequency equal to the crystal frequency of a discriminator embodying a crystal.

Another important object of my present invention is to provide a novel automatic frequency control circuit for a superheterodyne radio receiving system, the frequency control circuit employing both relatively fine and rough controls over the local oscillator network of the system and the source of AFC voltage being a discriminator which is characterized by a relatively steep frequency response characteristic.

Another object of my invention is to provide an audio frequency-responsive burst control network which functions to decrease the gain of a signal amplifier tube prior to the demodulator of the system whenever the audio frequency output volume "bursts" above a predetermined intensity level.

Still another object of my invention is to provide a novel form of AFC circuit for a radio receiving system, wherein the frequency adjusting element is responsive to a comparison between relatively low frequency currents, the comparison being regulated in accordance with the generated AFC voltage, and being further employed as a novel form of tuning detector device for the purpose of visually indicating the AFC performance.

Yet another object of my invention is to provide a carrier-exalted receiver of AM or PM waves which includes a crystal filter network for providing filtered carrier energy for the carrier exaltation function, the filtering, additionally, providing a relatively sharp AFC voltage, an AFC squelch circuit being employed to respond to a predetermined decrease of carrier amplitude below a desired intensity level.

Still other objects of my present invention are to improve generally the efficiency, reliability and stability of receiving systems adapted to receive signals normally subject to selective carrier fading, and to provide such systems in a manner such that they may be manufactured and assembled in an economical manner.

Still other features and objects will best be understood by reference to the following description, taken in connection with the drawing, in which I have indicated diagrammatically circuit organizations whereby my invention may be carried into effect.

Figure 2:
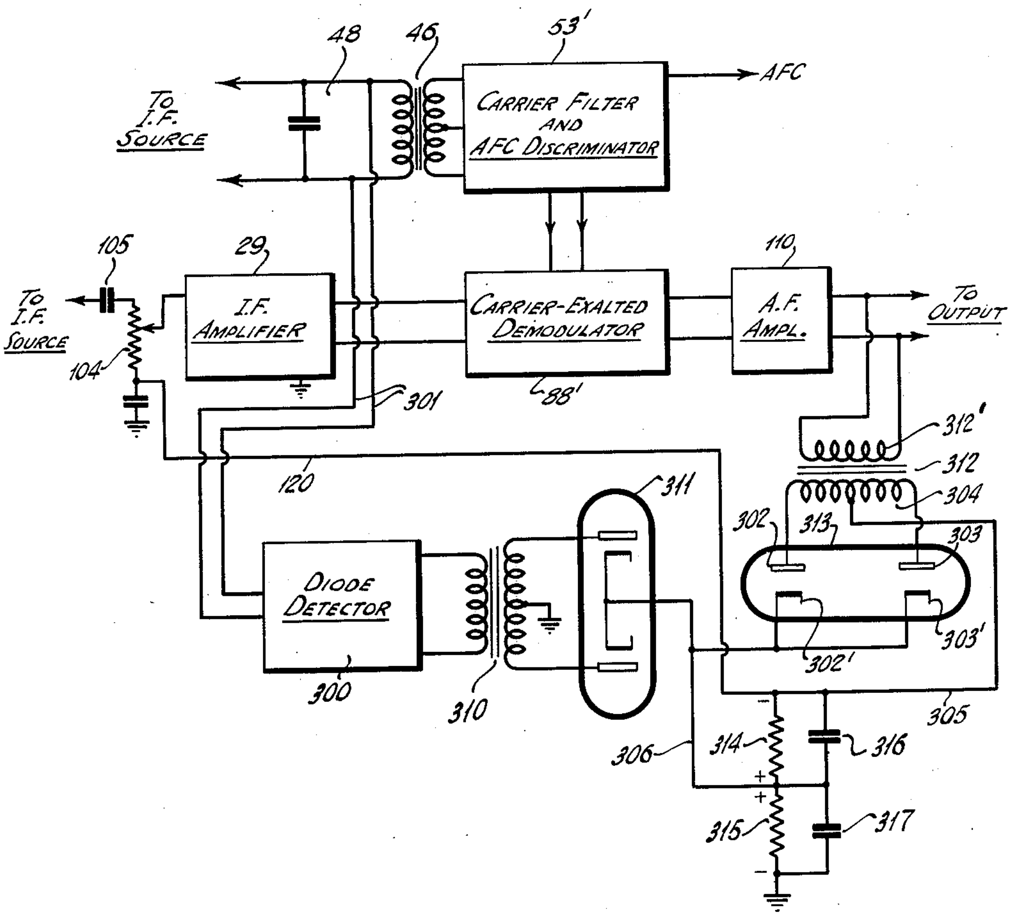
Figure 3:
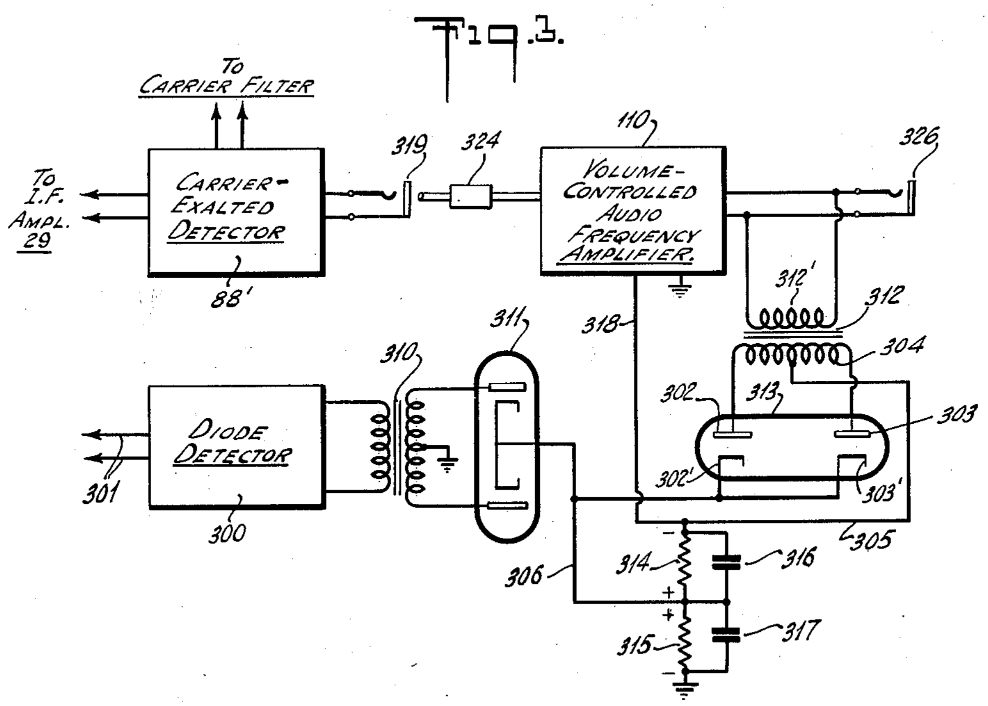
Figure 4:
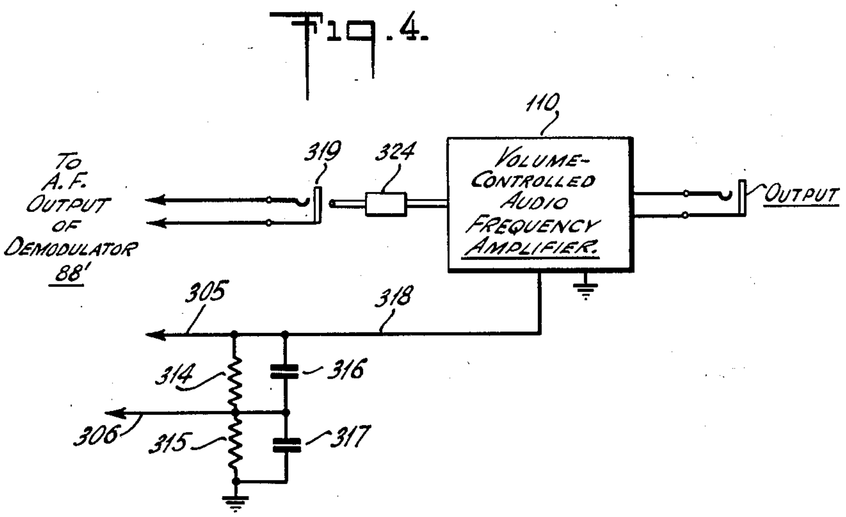

In the drawings:

Fig. 1 shows a receiving system for AM and PM waves embodying my invention;

Figs. 2, 3 and 4 respectively show different modifications of the burst control circuit.

Referring now to the accompanying drawings, there is shown in Fig. 1 a preferred embodiment of a radio receiving system employing my present invention, the numeral 1 designating a signal collector device particularly adapted to collect signals in a range of 1.5 to 30 mc. The signal collector is specifically shown as being a dipole, but it is to be clearly understood that any other signal feeding device or source may be utilized. For example, a grounded antenna circuit, a radio frequency distribution line, or any other suitable signal supply source may be utilized. It is to be understood that the signals collected by the dipole 1 may be either AM waves or PM waves. The signals may, also, be frequency modulation (FM) waves of a relatively restricted frequency deviation range, since in that case the signal character is closely akin to the character of PM waves. Those skilled in the art of radio reception are fully aware of the fact that in the case of AM wave transmission the carrier at the transmitter is varied in amplitude, while maintaining the carrier frequency constant, in response to the variations of a modulation signal. AM wave transmission occurs in the range of 1.5 to 30 mc. on various channels, and in foreign broadcast reception such AM transmission is commonly employed at the present time.

During PM transmission the amplitude of the carrier is maintained constant, while the phase of the carrier is varied in response to the modulation signal. The extent of phase deviation or shift depends upon the amplitude of the modulation signal, such as audio frequency amplitude, while the rate of phase deviation is a function of the modulation frequencies per se. In the case of narrow band FM transmission the extent of frequency deviation is relatively restricted, and, therefore, this type of transmission closely resembles PM transmission.

Regardless of the character of transmission the problem of selective carrier fading is a serious one, since there occurs a form of distortion upon signal reception which often renders the reproduced output unintelligible. In the case of reception from across the oceans, and even in the case of AM broadcast reception in the 550 to 1600 kc. band in this country, selective carrier fading presents a problem which many skilled in the art have attempted to solve. My present system disclosed in this application provides a solution of this problem, which solution embodies devices adapted to cope with various factors which arise during selective carrier fading. It is to be clearly understood that my invention is not limited to the specific frequency ranges mentioned above.

The tunable high, or radio, frequency amplifier 2 is preferably coupled to the signal collector device 1 by a switch 3. This switch is shown closed thereby indicating that signal reception is to be had in the 1.5 to 30 mc. range. The amplifier 2 may consist of one or more adjustably tuned stages for selectively amplifying the signals of a desired transmission channel. The following cascaded stages 4 to 7 inclusive are all conventional in construction, and are, therefore, schematically represented.

The network 4 is a converter network which may be constructed in any suitable manner to convert the selected high frequency signal waves to a lower or I. F. value of, for example, 450 kc. Any desired form of combined local oscillator-first detector circuit may be utilized for this purpose. The carrier frequency of the converted signal energy being reduced to 450 kc., the I. F. amplifier 5, which may include one or more selective amplifier stages, functions to amplify the I. F. energy and applies it to the following mixer stage 6. The mixer stage, as is well known to those skilled in the art, is supplied with 450 kc. signal energy and locally-produced oscillations from any suitable local oscillator. Since it is desired to provide a second I. F. value of 50 kc., the local oscillations will have a frequency of 500 kc. and are supplied to the mixer 6 by lead 8. The local oscillator network, which may be of any suitable construction, is fixedly tuned by means of the tank circuit 9 to the 500 kc. frequency. The mixer 6 may, if desired, be provided by a pentagrid tube having separate grids to which the I. F. energy and the local oscillation energy are supplied.

I utilize for the local oscillator a two-terminal oscillator circuit of the type disclosed and claimed by me in U. S. Patent No. 2,269,417 granted January 6, 1942. Since the specific construction of the oscillator circuit is not a part of my present invention, and since it is fully described in the last mentioned patent, a general description thereof is believed sufficient for the purpose of the present application. The oscillator tube 10 is of the twin triode type. The cathodes 11 and 12 of the triodes are connected in common to ground through a resistor 13. The tank circuit 9, tuned to the operating local oscillation frequency of 500 kc., is connected between the plate 14 and the grounded end of common resistor 13, the direct current blocking condenser 15 connecting the low potential side of circuit 9 to ground. The plate 16 is connected by lead 17 to the low potential side of tank circuit 9, positive voltage being applied to plates 14 and 16 through a resistor 18 from a suitable +B terminal. Numeral 19 denotes a voltage regulator tube of the gas-filled type which may be connected between the low potential side of tank circuit 9 and ground.

The control grid 20, located between cathode 11 and plate 14, is connected to the grounded end of cathode resistor 13. The second control grid 21 is connected on the one hand by direct current blocking condenser 22 to plate 14, and on the other hand to ground through a voltage divider resistor 23 which is provided with an intermediate tap. The upper section of the voltage divider 23 is bypassed by condenser 23', and the local oscillator energy is tapped off by lead 8 from the tap on divider 23. The numeral 24 designates a shielded transmission line, schematically represented, through which the lead 8 is to be understood as being run to the mixer 6. As stated previously the tank circuit 9 is fixedly tuned to 500 kc., and, of course, the coil 9' and condenser 9'' of the tank circuit will have their constants so chosen as to provide a normal resonant frequency of 500 kc. The manner in which the frequency of tank circuit 9 may be adjusted with a relatively fine and/or rough adjustment will be described at a later point.

The output of the mixer stage 6 will be at the lower or second I. F. value of 50 kc. The amplifier 7 may include one or more stages of selective amplification for the signals whose carrier frequency has been reduced to lower or second I. F. value of 50 kc. The output of the amplifier 7 is then utilized to provide the various voltages for performing the functions constituting the objects of my invention. It is to be understood that the successive steps of selective conversion and amplification of the signal are the same regardless of the nature of the signal received.

For example, and assuming switch 3 has been opened, the signals received by antenna 1', after selective amplification by amplifier network 2' at the received carrier frequency, may be applied to the input terminals of the converter 4. A switch 3' is schematically represented as being in circuit with the output amplifier 2' so as to indicate that signal waves in the lower AM frequency band of 550 to 1600 kc. may be utilized in the present receiving system should it be desired to minimize selective carrier fading effects. However, for the purposes of the present application it is assumed that switch 3' is opened and switch 3 is closed.

It is to be further understood that any suitable means of providing automatic volume control (AVC) may be employed in that portion of the system up to the network 7. Hence, I have schematically represented an AVC rectifier 25 which provides the usual AVC voltage in response to variations in amplitude of the carrier produced at the output terminals of network 7. The AVC voltage may be applied to one or more of stages 2, 4, 5, 6 and 7 depending upon the wishes of the system designer. Those skilled in the art are fully acquainted with the manner of constructing an AVC circuit, and it is believed sufficient schematically to indicate that the AVC line 26 is connected to the network 2 so as to control the gain thereof in a sense such as to compensate for carrier amplitude variation. The second AVC line 26' is shown connected from the amplifier 2' to a second contact of switch 27. The switch 27 may be adjusted to apply the output of the AVC rectifier 25 to either of the AVC lines 26 or 26'. The functions of the AVC connections are well-known; they act to vary the gain of the respective signal amplifiers in a sense to compensate for carrier amplitude variation.

The signal output of the 50 kc. amplifier 7 is applied through separate paths to auxiliary 50 kc. amplifiers 28 and 29 respectively. The shielding means for transmission line 30 is denoted by numeral 31, and is schematically represented. The line 30 terminates in an adjustable switch arm 32 which may be shifted from a "PM" contact to an "AM" contact. Between these contacts there is connected a phase shifter consisting of either condenser C or resistor R in series with condenser 35, inductance 37 and potentiometer 38. The constants of the phase shifter are so relatively chosen that when arm 32 is connected to the "PM" contact, there occurs a 90° phase shift in the signal energy applied to signal grid 33 of amplifier tube 28. When switch arm 32 is adjusted to contact "AM" there will be no shift in phase of the signal energy. It is desired to adjust arm 32 in accordance with the indicated reception of PM or AM signals.

The cathode 33' of amplifier tube 28 is connected to ground by resistor 34. The signal grid 33 is connected to ground by part of the phase shifter comprising condenser 35, iron core coil 37 and resistor 36 in a closed series circuit. An adjustable tap 38, slidable along resistor 36, is connected to the grounded end of cathode resistor 34. The potentiometer 36, 38 provides a range of phase shift adjustment which, when once set, gives the proper zero and 90° carrier phase relations when switch 32 is on contacts "AM" and "PM," respectively. The cathode resistor 34 provides self-bias for the grid of tube 28. For simplicity resistor 34 is unbypassed so that a small amount of degeneration takes place. The plate or output electrode 39 of tube 28 includes in circuit therewith the resonant primary circuit 40 of iron core transformer 41. The resonant secondary circuit 42 of transformer 41 is coupled between the input electrodes of the following 50 kc. amplifier tube 43.

The plates 39 and 44 of amplifier tubes 28 and 43 respectively are supplied in common from the +B terminal. Filter resistors 45 and 45' are respectively included in circuit with the primary windings 41' and 46' of iron core transformers 41 and 46. The respective screen grids of tubes 28 and 43 are supplied with suitable positive potentials by virtue of respective screen resistors 47 and 47' of suitable value and properly bypassed at either end thereof by condensers. Each of tuned circuits 40, 42 and 48 is sharply selective to 50 kc.

The carrier filter and AFC discriminator, which will now be described, generally follows the teachings of my application Serial No. 536,093, filed May 18, 1944, now Patent No. 2,416,911, dated March 4, 1947. The discriminator section of this network includes a piezo-electric crystal 49 which is tuned to the operating I. F. value, which in this case is 50 kc. The metallic input electrode 49' of the crystal filter 49 is connected to one side of the secondary winding 46'' of iron core transformer 46. The opposite end of winding 46'' is connected to the metallic output electrode 49'' of the crystal 49 through a condenser 50 which functions as a device for neutralizing the capacity between the crystal electrodes. Condenser 50 may have an adjustment so as to provide a degree of flexibility in neutralization. The output electrode 49'' of the crystal filter is connected to the respective anodes 51 and 52 of the opposed diodes 53 and 54 through a pair of parallel aperiodic paths. One of these paths consists of the resistor 55 shunted by condenser 56. The second path consists of resistor 57 which is shunted by condenser 58. It will, therefore, be seen that the relatively pure carrier energy output of crystal filter 49 is applied in parallel to the anodes 51 and 52.

Concurrently there is applied unfiltered I. F. energy to each of anodes 51 and 52. This is accomplished by connecting anode 51 to the input electrode 49' of crystal 49 through a path consisting of condenser 59. The anode 52 is connected to the input electrode of neutralization condenser 50 through a path consisting of condenser 60. The equalizing condenser 61 may be shunted across condenser 59, or condenser 60 if desired, to provide a measure of equalization of the two condenser paths. The unfiltered I. F. carrier energy is applied in polarity opposition to anodes 51 and 52, because the midpoint of winding 46'' is connected by lead 62 to the junction of the diode load resistors 63 and 64. These load resistors are connected in series between the diode cathodes 51' and 52'. Each of load resistors 63 and 64 is bypassed for I. F. currents by respective condensers 63' and 64'.

A measure of control over the selectivity of the crystal filter is provided by the resonant circuit 65 whose low alternating potential side is connected to lead 62, while its high potential side is connected to the output electrode 49'' of crystal 49. The circuit 65 may have its condenser 65' adjustable so as to permit the frequency of the circuit to be adjusted. It is preferred to tune circuit 65 to the crystal frequency thereby to provide a control over the selectivity of the crystal filter circuit.

The filtered carrier energy is taken off from the junction of the crystal output electrode 49'' and the neutralization condenser 50, and is transmitted over lead 66 to a demodulator circuit. However, prior to application of the filtered carrier energy to the demodulator circuit, the filtered carrier energy is subjected to the action of a limiter circuit which functions to remove residual amplitude modulation side bands which leak through the crystal filter circuit. The amplitude limiter is generally constructed in accordance with the teachings of my U. S. Patent No. 2,276,565 granted March 17, 1942.

The AFC voltage, for controlling the fine and rough adjustments of the local oscillator 10, is derived from the cathode end of load resistor 63. The cathode end of resistor 64 is grounded. The AFC lead 67 is connected to the cathode end of resistor 63 through filter resistor 68, and the right end of resistor 68 is connected to ground through the condenser 69. The resistor-capacity network 68, 69 functions as a time constant network to insure the transmission over lead 67 of relatively slow-varying AFC potentials, and rejects I. F. or modulation frequency potentials. It is desired to provide an AFC voltage which increases very sharply on either side of the operating I. F. value of 50 kc. in response to a departure of the applied I. F. signal energy carrier frequency value from the operating frequency of 50 kc.

As explained in my aforesaid application Serial No. 536,093, the AFC voltage is the differential of the rectified voltages across resistors 63 and 64. These rectified voltages of equal value and of opposite polarity relative to ground when the I. F. signal energy at transformer 46 has an instantaneous mean frequency equal to the crystal frequency. At anodes 51 and 52, for the same resonance condition, the resultant vector voltages are equal. These resultant vector voltages are provided by the filtered and unfiltered I. F. signal energy applied to each of the diode anodes. Each of condensers 59 and 60 is chosen so as to provide phase shift in the unfiltered signal energy transmitted therethrough. On the other hand, the crystal 49 has a characteristic such that no phase shift occurs in the carrier energy existing at its output electrode 49'' when the carrier frequency is equal to the crystal frequency. However, a phase shift which becomes progressively greater, depending upon the direction of frequency shift relative to crystal frequency, occurs when the I. F. signal energy has a carrier frequency which departs from crystal frequency.

The phase shift introduced by condensers 59 and 60 is such that for the in-tune condition a phase shift of 90° occurs in the I. F. signal energy transmitted through each of the condensers. Hence, at each of anodes 51 and 52 there will exist at the in-tune condition a pair of voltages, respectively filtered and unfiltered, in phase quadrature relation. However, the filtered carrier energy will exist in parallel relation, whereas the unfiltered signal energy will exist in polarity opposition. It will, therefore, be seen that in the in-tune condition the resultant vector voltages at each anode necessarily are equal. Hence, the rectified voltages are equal in value, and of opposite polarity. However, should the carrier frequency of the applied I. F. signal energy at transformer 46 shift from the crystal frequency value then the resultant vector voltages at the diode anodes 51 and 52 will become unequal, in a direction and degree determined by the direction and amount of signal input frequency shift. As stated before, the developed AFC voltage increases very sharply for a relatively small shift in I. F. carrier frequency in either direction from the crystal frequency.

With tuned cicuit 65 tuned to the crystal frequency, the selectivity of the crystal filter is reduced. As a matter of fact by using the tuned circuit 65 the "Q" of the crystal filter can be lowered to approximately 2000, whereas without it the "Q" would be of the order of 10,000. Adjustment of the condenser 65' of circuit 65 detunes the circuit and increases the selectivity of the crystal filter, but upsets the phase between the filtered carrier energy and the unfiltered I. F. signal energy. The phase maladjustment is corrected by the respective condensers 56 and 58. The result is an adjustment of selectivity of the crystal filter by varying the tuning of circuit 65, and compensating for the phase change by altering the ratio of the resistance of resistor 55 to the capacity of condenser 56 and the ratio of the resistance of resistor 57 to the capacity of condenser 58. The result, also, is to make the crystal output circuit of lower impedance so as to raise the "Q" of the filter to the desired value of approximately 3000.

The filtered carrier energy derived from crystal filter 49 is transmitted over lead 66 to the control grid 70 of the amplitude limiter tube 71. The function of the limiter tube 71 is to remove any amplitude variations which may exist on the filtered carrier energy by virtue of the crystal filter not removing such variations. Of course, the crystal 49 is of such high selectivity that the frequency variations of the carrier energy are substantially eliminated. The energy applied to grid 70 is of the 50 kc. carrier frequency with frequency components of very small amplitude on either side of the carrier. Of course, any other desirable type of amplitude limiter may be used in place of the twin triode tube type shown.

The amplitude limiter tube 71 essentially consists of a pair of triodes whose cathodes 72 and 73 are connected in common to ground by the unbypassed resistor 74. The control grid 70 is connected to ground through the resistor 75, and the direct current blocking condenser 76 is inserted in the path from lead 66 to grid 70. The plate 77 of the input triode of tube 71 is connected to the +B terminal of the direct current source through a path which includes a carrier on-off switch 78, resistor 79, lead 80 and a carrier strength indicator 81. The indicator 81 may be a milliammeter, or any other suitable device, for indicating the intensity of the carrier energy delivered to the subsequent demodulator.

The output triode of tube 71 includes the control grid 82 which is connected to ground. The plate 83 of the output triode is connected to the upper end of coil 84 of the iron core transformer 85. The lower end of coil 84 is connected to grid 82 by the bypass condenser 86. Coil 84, which is the primary winding of transformer 85, is tuned by shunt condenser 87 to the operating I. F. value of 50 kc. It will be seen that the plates 83 and 77 are each positively biased from the +B terminal, and that switch 78 functions to control the injection of filtered carrier energy into the demodulator circuit. If the switch 78 is open, then the limiter circuit is rendered inoperative thereby preventing the application of the filtered carrier energy to the demodulator circuit.

It is not believed necessary to describe the functioning of the limiter 71 in any detail, since the description of its operation will be found in my aforesaid U. S. Patent No. 2,276,565. It is sufficient for the purposes of this application to point out that when grid 70 is made positive increased cathode current is drawn through cathode resistor 74. Hence, the cathodes 72 and 73 are made more positive with respect to ground. Making the cathode 72 more positive with respect to ground is equivalent to making grid 82 more negative. Thus, a positive change on the grid 70 effects a resultant negative change on the grid 82. This phase reversal causes the output triode to effect the negative grid limiting for the positive half cycles of the input wave, while the input triode effects the limiting for the negative half cycles. Thus, when grid 70 is swung negative, negative grid cut-off limits the change in cathode current caused by the input wave. When the grid 70 is swung positive, then grid 82 is effectively swung negative until negative cut-off is reached for the output triode.

The limited carrier wave energy is applied in parallel to the opposed diodes 88 and 89. The secondary winding 90 of iron core transformer 85 is connected between the junction of load resistors 91 and 92 and the midpoint 93 of secondary coil 94 of the iron core transformer 95. The coil 94 is shunted by condenser 96 which tunes the secondary circuit to the operating I. F. value of 50 kc. The primary coil 97 is shunted by condenser 98, and the latter tunes the primary circuit to the same frequency value. The entire transformer network provides a band pass response curve 10 kc. wide at 50 kc. The primary circuit 98, 97 and secondary circuit 94, 96 are shunted by respective damping resistors 99 and 100 to insure a flat top for the band pass response curve of transformer 95. Load resistors 91 and 92 are each shunted by respective carrier bypass condensers. The cathode end of resistor 92 is grounded, and audio frequency voltage is taken off from the cathode end of load resistor 91.

The modulated carrier waves, reduced to the 50 kc. frequency, are applied to the primary circuit of transformer 95 by means of the amplifier tube 29. The signal control grid 100 of the latter is connected to the slider 103 of potentiometer resistor 104 whose upper end is connected by direct current blocking condenser 105 and lead 106 to the lead 30. The lower end of potentiometer resistor 104 is established at ground for signal frequency potentials by the condenser 107. Adjustment of slider 103 determines the intensity of the signal energy applied to grid 100. Cathode 101 of tube 29 is connected to ground by unbypassed resistor 102. The plate circuit of amplifier 29 includes a signal on-off switch 108, which acts to connect or disconnect the +B terminal from the plate 109 of the tube. In general, the amplifier 29 may be constructed in a manner similar to the I. F. amplifier 43.

It will be seen that the amplifier tube 29 applies the amplified signal voltages in push-pull, or phase-opposed, relation to the pair of diodes. This follows from the fact that the anode of diode 88 is connected to one end of coil 94, while the anode of diode 89 is connected to the opposite end of coil 94. The midpoint 93 is at ground potential for I. F. currents by virtue of the midpoint being connected to ground through a path comprising lead 93', coil 90, lead 90' and condenser 92'. For PM signal detection the filtered 50 kc. carrier energy is adjusted to be in phase quadrature with the unfiltered, amplified signal energy at the respective diode anodes by means of phase shifter 35, 36, 37, and C. As the phase of the signal energy at transformer 95 rapidly deviates relative to the phase quadrature position, unequal signal voltages are applied to the diodes thereby to produce unequal rectified voltages across the load resistors 91 and 92. The differential of the rectified voltages corresponds to the modulation, or audio, signals to be reproduced. If the switch 32 is adjusted to the "AM" contact, then the filtered carrier energy is applied to coil 90 of the demodulator at a phase difference of zero or 180° with the unfiltered signal carrier. In other words, the phase shifter now includes 35, 36, 37 and R. Push-pull AM detection will result, with carrier exaltation due to the high level of the filtered carrier at the common input circuit of the opposed diodes 88 and 89.

The modulation signal voltage may be amplified in as many audio frequency amplifier stages as is desired. The first audio frequency amplifier tube 110 is shown as having its input electrodes adjustably coupled across the demodulator output load by the potentiometer 111. The control grid 112 is connected to the cathode end of load resistor 91 through a path including resistor 113 and condenser 114 in series. The lower end of resistor 113 is connected to ground through a trap circuit consisting of a series tuned circuit resonant to 50 kc. The trap circuit consists of condenser 115 in series with the iron core coil 116. The iron core of coil 116 may be adjustable for tuning. The function of the trap circuit 115, 116 is to prevent any residual carrier current from overloading the audio frequency amplifier tube 110. The audio frequency signal voltage developed across potentiometer resistor 111 is applied to the control grid 112 of tube 110, the slider 111' varying the intensity of the audio frequency signals to be amplified. The plate circuit of the tube 110 includes the primary winding of the audio frequency output transformer 117, and it will be understood that the transformer 117 may feed any desired type of audio frequency output network. Such network may comprise additional stages of audio frequency amplification finally terminating in a reproducer.

In carrier-exalted reception of AM or PM carrier waves, it has been found that the use of carrier exaltation effects a complete removal of harmonic distortion normally encountered due to carrier fading. However, there remains a distortion in the form of "volume bursts" which occur during the period of carrier fading. These bursts take the form of sudden increases in the audio output volume of the receiver so that annoying peaks of high sound volume are experienced. This effect destroys the normal volume variation of the program. If the program being reproduced is music, false forte and pianissimo passages are produced.

One method of controlling volume bursts is shown in Fig. 1 of the drawing. There is employed a rectifier 118, schematically represented. One input terminal of the rectifier may be grounded, while the high potential input terminal is connected by lead 119 to the control grid 112 of audio frequency amplifier tube 110. In other words, the rectifier 118 is energized by the audio signal voltage output of the demodulator. Preferably the same intensity of audio signal voltage is applied to rectifier 118 as is applied to the input electrodes of tube 110. If desired, the audio signal voltage may be derived from the output circuit of tube 110. Furthermore, the potentiometer 118′, schematically represented, may be provided to regulate the intensity of the audio frequency voltage applied to rectifier 118. The rectified voltage output of rectifier 118 is applied over lead 120 to the signal grid 100 of the amplifier tube 29.

The lead 120 preferably includes a resistor-condenser filter network, consisting of the adjustable resistor 121 and condenser 122, whose time constant is chosen so that the control on grid 100 is relatively fast-acting. In other words, the burst control circuit connected to the lower end of resistor 104 functions in the manner of a quick-acting AVC circuit. The rectified voltage output of rectifier 118 is applied in a negative polarity sense to the signal grid 100 of amplifier tube 29. In this way the gain of the amplifier feeding the demodulator is decreased whenever the audio signal intensity level at grid 112 rises above a predetermined level. This predetermined level may be adjusted to a desired value.

Of course, rectifier 118 could have a delay bias such that no rectification occurs until the input signal peaks at the input terminals thereof exceed normal operating levels. When rectification occurs due to excessive level of audio signal, a negative bias voltage is developed and transmitted through the time constant network 121, 122 and lead 120 to the signal grid 100. This negative voltage reduces the gain of amplifier 29, and after the burst has been suppressed the gain of tube 29 is restored to normal value by virtue of the discharge of condenser 122 thereby effectively removing the negative control bias from grid 100. Other arrangements may be employed for burst control, as will be hereinafter disclosed in Figs. 2, 3 and 4.

It is, of course, important that the filtered carrier energy delivered to the demodulator be maintained at the I. F. value (50 kc.) in order to secure optimum results. It is for this reason that the AFC circuit is employed. There will first be described the relatively fine, or sharp, AFC action. The sharp AFC circuit utilizes the electronic reactance tube 123 whose plate to cathode impedance is shunted across the tank circuit 9 of the local oscillator tube 10.

The reactance tube 123 may be of any well known type, such as a pentode. The plate 124 thereof is connected to the +B terminal through the coil 9′ of tank circuit 9. The control grid 125 is connected to the junction of condenser 126 and resistor 127. Condenser 126 and resistor 127 provide a phase shifter network which functions to cause the alternating voltage applied to grid 125 to be normally in phase quadrature with the alternating voltage at plate 124. The lower end of resistor 127 is established at ground potential for alternating currents by the condenser 128. The plate 124 is connected to the junction of condenser 126 and the radio frequency choke coil 139. The cathode of tube 123 is connected to ground through the usual grid bias resistor 130 suitably bypassed for high frequency currents.

The relative magnitudes of resistor 127 and condenser 126 are so chosen that the plate to cathode impedance of tube 123 simulates a capacitative reactance. Those skilled in the art of radio communication are well aware of the manner of constructing a reactance tube circuit such that it will simulate a capacitative reactance. The magnitude of the capacitative reactance depends upon the gain of tube 123, and the latter may be varied by varying the voltage of control grid 125. Specifically, it is pointed out that if the resistive magnitude of resistor 127 is made relatively small compared to the capacitative magnitude of condenser 126, then the plate to cathode impedance of tube 123 will simulate a capacitative reactance across tank circuit 9, since the plate 124 is connected to the high potential side of coil 9′ and the cathode of tube 123 is effectively connected through the grounded electrode of condenser 15 to the low potential side of coil 9′. The gain of tube 123 is varied automatically by virtue of the AFC bias applied over lead 67 and lead 67′ to the switch 131 when the latter is in its "on" position.

When switch 131 is in its "off" position, the grid 125 is returned to the grounded end of cathode bias resistor 130. Therefore, the gain of tube 123 remains fixed at the value determined by the bias voltage developed across resistor 130. The switch 131 provides a means for selectively rendering the reactance tube ineffective. If it is not desired to employ fine, or sharp, AFC action at the local oscillator, then switch 131 is adjusted to "off" position. The sharp AFC action depends upon the magnitude and polarity of the AFC voltage developed at the cathode end of resistor 63 in the AFC discriminator circuit. In my aforesaid application Serial No. 536,093 I have explained in detail the functioning of the crystal filter network to provide frequency discrimination. The crystal 49 can respond to frequency changes over a limited range, and, in particular, to slow frequency changes as may, for example, result from oscillator drift in a superheterodyne receiver. As to such frequency changes within the band of frequencies passed by it, the crystal 49 acts as series-connected inductance and capacity.

When the received frequency is exactly that of the crystal, it produces no phase change and the filtered carrier remains at 90° from the unfiltered energy passing through condensers 59 and 60 respectively. When, however, the incoming frequency changes slowly toward one side of the passband of the crystal, the filtered output changes in phase in a direction toward the phase of the current in one of condensers 59 and 60, and away from the phase of the current in the other of such condensers. In this way there is produced increased energy on one of rectifiers 53 and 54 and decreased energy on the other, so as to create a direct current potential across rectifier load resistors 63 and 64.

Upon change of the incoming frequency in the opposite direction, the phase of the filtered output of the crystal changes in the opposite direction thereby decreasing the energy on the rectifier where it before was increased, and increasing the energy on the other rectifier so as to produce a reversed direct current potential drop across the load resistors. This frequency discrimination action is similar in certain of its aspects to that described in my application Serial No. 484,973, filed April 29, 1943, now Patent No. 2,363,652, dated November 28, 1944. The AFC discrimination action is the same for AM and PM signal waves. Obviously, the direction and extent of variation of the reactive impedance of the reactance tube 123 will depend upon the variation in AFC bias transmitted over lead 67. This, of course, is the well-known AFC action which is familiar to those skilled in the radio communication art. In this case the AFC circuit functions as a system having a high degree of control to maintain the mean frequency of the signal energy applied to circuit 48 substantially equal to the predetermined reference frequency, which is the resonant frequency of the piezo-electric crystal 49, for the best operation of the circuit.

In accordance with another feature of my invention, an improved motor-driven, or rough adjustment, AFC circuit is provided for the local oscillator. When the slow drift of the oscillator has caused the effective frequency value of the I. F. energy to drift to a point beyond the safe correcting range of the reactance tube 123, then the motor-driven AFC action is available for correction. The motor-driven correction circuit generally does not have an inherent restoring force. It is free to operate at any place in its tuning range, and it will remain in inoperative state should the incoming signal drop out. In addition to the shunting of a motor-driven variable condenser 132 across the tank circuit 9, the rough AFC system embodies a resonance indicator tube 133 as well as an AFC squelch circuit 134.

Considering the rough adjustment AFC system more specifically, the variable condenser 132 has the stator 135 thereof connected by lead 136 to the high potential side of tank circuit 9. The adjustable or variable element 137 of the condenser is effectively at ground potential by virtue of the contact between the grounded metallic housing 138 and the metallic driven shaft 139. Hence, the capacity of condenser 132, which may have a normal value of about 25 micromicrofarads (mmf.), is electrically shunted across tank circuit 9. In other words, condenser 132 supplements the electronic condenser provided by the reactance tube 123. The adjustable element or rotor 137 is actuated by a two phase motor which is schematically represented. The motor may be of any suitable construction. The system employed for energizing the two phase motor is generally disclosed in my application Serial No. 393,339, filed May 14, 1941, now Patent No. 2,380,947, dated August 7, 1945, especially Fig. 1 thereof.

The numeral 140 designates the rotor of the two phase motor. The latter is schematically represented, since its construction is well known in the electrical art. The energizing windings of the motor rotor 140 are represented by numerals 141 and 142. These windings are wound on a common iron core, and each carries 60 cycle current derived from the 60 cycle supply source. The source of 60 cycle current may be the usual power line source of alternating current at 110 volts. The numeral 143 designates the source of 60 cycle current, and it will be understood that the winding 142 is connected to be energized from source 143. One end of winding 142 is connected by lead 144 to one of the contacts of the single pole-single throw switch 145, while the opposite end of winding 142 is connected through condenser 146 and lead 147 to the second contact of switch 145. When switch 145 is opened then winding 142 is de-energized, and the two phase motor cannot be operated. Hence, for motor-driven AFC operation switch 145 is closed.

The condenser 146 functions as a phase shifter condenser. The rotatable element 140 of the two phase motor is schematically indicated as being mechanically coupled with the adjustable or rotor element 137 of variable condenser 132. This mechanical coupling may be provided in any suitable manner, but is schematically illustrated herein as being provided by a shaft 148 which carries a driving gear 149. The rotor shaft 139 is provided with a section 139' to which it is coupled by means of a telescopic coupling. It is not necessary to show the mechanical details of the telescopic coupling, since those skilled in the art of constructing mechanical tuning elements are well acquainted with the construction of such a coupling. The numeral 150 schematically represents the telescopic coupling, and it is to be understood that the latter may be generally of the type wherein the adjacent ends of sections 139 and 139' are telescoped.

For example, the end of section 139 may be provided with a key which is normally in engagement with a slot in the end of section 139' so that the two sections then may be variably telescoped to allow gears 149, 151 to be disengaged. This would permit adjustment of rotor 137 without actuation of gear 149. It is desirable to provide such action so as to permit the driven gear 151 of shaft section 139' to be disengaged from gear 149 in response to the pushing of the knob 152 against the bias of spring 153 in an axial direction. In other words, when it is desired to change the normal adjustment of rotor 138 it is merely necessary to push knob 152 (which may be mounted on the exterior of the operating panel and at the upper end of shaft section 139') in a direction towards condenser 132. This will cause the end of shaft section 139' to move axially relative to the end of section 139, and thereby permit gears 149 and 151 to become disengaged. The knob 152 may then be rotated for adjusting rotor 137 to any suitable point so as to provide a desired normal capacity across tank circuit 9. Upon release of knob 152 spring 153 will push the knob into normal position, and permit gears 149 and 151 to engage.

In explaining the operation of the two phase motor, it is first pointed out that 60 cycle current must flow through windings 141 and 142 in order to actuate the motor armature, or rotor, 140. Furthermore, these currents must be in phase quadrature in order to energize the rotor 140. The 60 cycle current flowing through winding 142 is derived directly from the 60 cycle source, but the phase shifter condenser 146 is so chosen in magnitude as to provide a 90° phase shift in the 60 cycle current flowing through winding 142. Hence, in order to energize the two-phase motor it is merely necessary for 60 cycle current to appear in winding 141.

However, the 60 cycle current will not appear in winding 141 unless the modulated carrier energy at discriminator input circuit 48 has a mean frequency which is not equal to the predetermined I. F. value (50 kc.). In other words, the AFC bias transmitted over lead 67 is utilized to control the magnitude of 60 cycle current flowing in winding 141. If the AFC bias transmitted over lead 67 is zero, there will be no flow of 60 cycle current through winding 141. However, if AFC voltage is developed, such voltage will cause 60 cycle current to appear in winding 141, and the current will have a magnitude and direction depending respectively upon the extent and direction of the shift of the mean frequency of the applied modulated carrier energy from the predetermined frequency of circuit 48. In this way there is provided a method of operating the two-phase motor at variable speed and in relative directions. This permits an accurate control over the adjustment of rotor 137.

The control circuit for the 60 cycle current in winding 141 involves the following circuit elements. The tube 154, which may be a pentagrid tube of the 6SA7 type for example, has 60 cycle voltages applied to spaced control grids 155 and 156 thereof. The cathode of tube 154 is connected to ground through a grid bias resistor 157 of about 1500 ohms. The first grid 155 is connected through direct current blocking condenser 158 (about 0.1 mf.) to the ungrounded end of potentiometer resistor 159. The latter has a value of about 20,000 ohms, and its slider 160 is connected to the third grid 156. The plate 161 and screen grids 162 are connected through respective resistors 163 and 164 (500,000 and 150,000 ohms respectively) to lead 165 terminating at the +250 volts power supply terminal.

The ungrounded end of resistor 159 is connected by lead 166 and resistor 167 to one end of the secondary winding 168 of 60 cycle transformer 169. The center tap of winding 168 is grounded. The primary winding 170 is shunted across the source terminals 143, and includes resistor 171 (about 8000 ohms) in circuit therewith. Hence, potentiometer resistor 159 is effectively shunted across half of winding 168, the resistor 167 (of about 3 megohms) being in series with resistor 159. Adjustment of slider 160 results in the application of 60 cycle voltages of different phases to spaced grids 155 and 156. The slider 160 is so adjusted on resistor 159 that in the absence of AFC bias on grid 155 the alternating voltages balance out in the plate circuit of tube 154.

This balance of voltage in the plate circuit is brought about by the presence of a relative phase reversal between the two grids of tube 154. The unbypassed screen resistor 164 functions as a plate resistor relative to grid 155, and as a control grid resistor relative to plate 161. The resulting effect is similar to that of two tubes in cascade amplifiaction in which each introduces the phase reversal of a single tube. Consequently, the voltage appearing on plate 161 from grid 155 has two phase reversals, while that from grid 156 has only one. Hence, when voltages of the same phase are fed to the two grids they oppose, and cancel at the plate. The relative magnitudes of the voltages fed to the two grids are adjusted by slider 160 on potentiometer resistor 159. The adjustment is such that when switch 174 is in the "off" position (grid 155 grounded), the voltages fed to grids 155 and 156 balance in the plate circuit. When switch 174 is thrown to the "on" position, AFC bias is applied to grid 155 from lead 67. The control voltage is fed to grid 155 through grid resistor 172 and time-constant circuit 173, 175.

Depending on the polarity and magnitude of the AFC bias applied over lead 67, and assuming switch 174 in "on" position, the direct current voltage of grid 155 will vary accordingly. This means that there will be developed 60 cycle voltage across resistor 163 which will be positive or negative in phase depending upon the polarity of grid 155. For example, if the grid 155 is biased in a negative polarity sense, and assuming the 60 cycle voltage on that grid is normally of a negative phase, then the relatively positive 60 cycle voltage on grid 156 will cause the appearance across plate resistor 163 of 60 cycle voltage of relatively positive phase. On the other hand, if the grid 155 is biased in a relatively less negative sense, then there will be developed 60 cycle voltage across resistor 163 of relatively negative phase. It will, therefore, be seen that the AFC voltage varies the relative effect of the alternating voltage at each of grids 155 and 156 on the plate current of tube 154.

The alternating voltage developed across resistor 163 is amplified by tube 176, which may for example be a pentode of the 6AG7 type. The control grid 177 of tube 176 is coupled by condenser 178 to the plate end of resistor 163. The control grid 177 is returned to the grounded end of the grid bias resistor 179 through resistor 180. The plate 181 of tube 176 is connected to the positive voltage supply lead 165 through winding 141, and the screen grid of tube 176 is connected to the positive voltage supply lead through a voltage reducing resistor 182, whose lower end is bypassed to ground for alternating currents by condenser 183. Winding 141 is shunted by condenser 184 (of about 0.75 mf.), and functions to tune the winding 141 to resonance with the 60 cycle current desired for energizing the motor. It will, therefore, be seen that the two-phase motor when energized will vary the angular position of rotor 137 in a sense to provide correction at the tank circuit 9. When knob 152 is pushed against spring 153, as stated previously, the rotor 137 is disengaged from the motor. Rotation of the knob, while still depressed, turns the rotor 137, and in this way condenser 132 may be centered so that it has an equal plus and minus range of control. It is to be understood that knob 152 will be provided with proper dial calibration.

The AFC squelch circuit is desired to function when the received carrier amplitude decreases to an undesirably low value. In such case the grid current flow through resistor 75 of the limiter tube 71 becomes very small thereby decreasing the negative bias on the input grid of the automatic squelch tube 200. The tube 200 is connected to the tube 154 so as to shunt the plate circuit of 154 by the relatively low plate resistance of the two triodes in tube 200 when the grid end of resistor 75 assumes a negative potential less than a predetermined amplitude. This shunt reduces the amplification of tube 154 so that the 60-cycle voltage fed to tube 176 is insufficient to operate motor 140. In this way it is possible to prevent an interfering carrier from actuating the motor-driven AFC circuit when the desired carrier becomes excessively low, or disappears, due to fading.

The AFC squelch tube 200 may be of any suitable construction, although specifically represented as a twin-triode of the 6SN7-GT type, and has its effective plate to cathode impedance shunted across the plate to cathode path of tube 154. Thus, the plates of both triode sections of tube 200 are connected together, and by lead 201 to plate 161 of tube 154. The control grids of the two triode sections are connected in common to lead 134. The latter (designated as "AFC Squelch") is connected to the grid end of resistor 75 through the resistor element of filter network 134', thereby to prevent the impression of any alternating voltage on the grids of squelch tube 200.

The cathodes of tube 200 are jointly connected through a "squelch switch" to ground. To be effective the squelch switch must be closed thereby providing a squelch "on" adjustment. It will be evident that tube 200 constitutes an electronic load on the plate circuit of tube 154. The electronic load varies in magnitude depending on the magnitude of the normally-negative voltage applied over lead 134 to the grids of tube 200. The negative voltage developed at resistor 75, due to grid current drawn by the output triode section during normal operation of limiter tube 71, is applied through time constant circuit 134', and functions to reduce the plate current of tube 200 to a minimum. Hence, there is minimum diversion of plate current in the plate circuit of tube 154, and the latter operates efficiently. However, when the carrier decreases below a usable amplitude, as during bad fading, the negative voltage at resistor 75 decreases to a minimum value. This causes the plate current of tube 200 to rise to a maximum thereby causing sufficient shunting action on tube 154 to cause the two-phase motor to cease operation. In this way the squelch circuit prevents undesired interfering signals from taking control of the motor-driven AFC during periods of excessively low carrier amplitude.

The condition of resonance of the receiver is visually indicated by tube 133. The latter is a cathode ray tube indicator of the type providing a pair of electronic "shadows" or non-illuminated areas. The tube 133 may be, for example, one of the 6AF6-G type comprising an electron emitter 210, connected to the grounded center-tap on transformer secondary 168, a fluorescent target electrode 211, and a pair of electron ray control electrodes, or rods, 212 and 213. The rods 212 and 213 are connected to the respective ends of winding 168, and are normally biased by the algebraic difference between the negative voltage drop across the cathode resistor 214 and the 92 volts across each half of the winding 168. The target electrode 211 is connected by lead 215 to the +250 volts terminal through winding 141 and lead 165.

Those skilled in the art of radio communication are fully acquainted with the manner of constructing and operating a cathode ray tube indicator of the double-shadow type. The representation of tube 133 is purely schematic, and actually each of control rods 212 and 213 is located between the cathode 210 and the outwardly flaring target 211. The rods are vertical and parallel to cathode 210, but are located on respectively opposite sides thereof. Normally, the positively charged target 211, whose inner conical face is coated with a fluorescent material, attracts electrons from the cathode. The electrons fall on the coated face of the conical target and cause illumination. If the control rods 212 and 213 are at minimum negative bias relative to cathode 210, then the rods have no effect on the electrons. However, if the rods become increasingly negative, they repel electrons and cause a non-illuminated area, or "electronic shadow" to appear on the respective adjacent portions of the target.

What is desired for indication of resonance is that the electronic shadows be of minimum angular width for "in-tune" condition of the receiver. However, for "off-tune" to either side of the desired carrier frequency, it is desired to have one or the other of the shadows to widen out thereby indicating both the sense and degree of off-resonance. In order to adjust the tube 133 to indicate balance condition, that is with both shadows of minimum equal widths, the slider 160 is adjusted until that indication is provided. It is best first to adjust switch 174 to "off" position, and observe the indication of tube 133. If tube 133 indicates balanced shadows, then no adjustment is needed for slider 160. However, if an unbalanced condition is indicated, the slider 160 is shifted until balanced minimum shadows are attained. In the balanced indication state, the target 211 has a positive voltage determined solely by the +250 volts applied thereto. This is true since for the balanced condition, there is no alternating voltage appearing at plate 181. Hence, the rods 212 and 213 are at minimum negative bias.

However, if 60 cycle current flows through winding 141 in one phase or the opposite phase, the voltage of target 211 will increase thereby causing more space current to flow through resistor 214. This additional space current will consist of an alternating current of a phase which will be equal to that on one of the ray-control electrodes, and opposite to that on the other. As a result, the alternating current bias formed on cathode resistor 214 will increase the effective bias of one ray-control electrode, and decrease that of the other. This relative difference in ray-control bias causes one of the shadow angles to increase, and the other to decrease. It can be seen that as the phase of the voltage on winding 141 is reversed by the action of the control voltage fed from lead 67, the dissymmetry of the shadow angles, also, reverses. The tuning indicator thus indicates the direction of mistuning, and in-tune condition, and, also, the condition of proper balance in the motor-control circuit.

The burst control circuit shown in Fig. 1 has been described as utilizing rectified audio voltage applied to the predemodulator amplifier tube. This form of circuit has the disadvantage that the true volume range is not necessarily restored. The volume is merely compressed so that the peaks of volume do not rise above a certain amount. In Fig. 2 there is shown a burst control system which adjusts the output volume in accordance with a standard of reference, instead of merely reducing the volume peaks. The standard of reference is the detected output voltage of diode detector 300 whose input terminals are coupled by leads 301 to the crystal input circuit 48. It will be understood that the schematic representations 29, 53', 88' and 110 include the corresponding circuits of Fig. 1.

The detected output of detector 300, the latter having input terminals coupled to the I. F. amplifier output, tends to follow the normal volume variations of the transmitted signal. This would be especially true for diversity reception. The detected output voltage of the carrier-exalted demodulator circuit 88′ (the detected output of diodes 88 and 89 in Fig. 1) is, however, applied through transformer 312 to a pair of diodes embodied in tube 313. The transformer primary 312′ may, of course, be coupled to the input of audio amplifier 110, if desired. In place of a double-diode tube 313, separate diode tubes may be used. The anodes 302 and 303 of the pair of diodes in tube 313 are connected to respective ends of secondary winding 304. The midpoint of winding 304 is connected by lead 305 to the upper end of load resistor 314. The latter is connected in series with load resistor 315 to ground, and each of resistors 314 and 315 is bypassed by respective condensers 316 and 317 for alternating currents.

The cathodes 302′ and 303′ are connected in common by lead 306 to the lower end of load resistor 314. Resistor 315 acts as the load resistor for rectifier 311. The latter is, also, shown as a double diode rectifier whose cathodes are connected to the ungrounded end of load resistor 315 by lead 306. The anodes of rectifier 311 are connected to opposite ends of the secondary winding of transformer 310. The center-tap on the secondary winding is grounded, and, therefore, the detected output of detector 300 will be rectified by rectifier 311 to provide a voltage across resistor 315 proportional to volume variations of the detected signals.

The differential voltage of the rectified voltages across resistors 314 and 315 is applied over lead 120 to the signal control grid of I. F. amplifier 29 which amplifies the unfiltered signal fed to the carrier-exalted demodulator 88′. It will be noted that the rectified voltage appearing across resistor 315 is a positive reference voltage. The negtaive rectified voltage developed across resistor 314 must equal this positive reference voltage, or a control potential will be applied to the controlled I. F. amplifier 29. The control potential will be positive if the output of the carrier-exalted demodulator 88′ is less than the detected output of detector 300. The latter would be the case for a volume "dip" in the carrier-exalted output of demodulator 88′. If a positive control potential (that is where the voltage across resistor 315 exceeds the voltage across 314) is applied over lead 120, there is caused an increase in the gain of controlled amplifier 29 so as to bring the amplitude of the output of demodulator 88′ up to equal that of the output of detector 300.

The control voltage applied over lead 120 is of negative polarity when the rectified voltage across resistor 314 exceeds the rectified voltage across resistor 315. This occurs when the output of the demodulator 88′ is greater than the output of detector 300, as would be the case for a volume burst. The control of the amplifier 29 thus has the effect of applying an automatic volume control to the output of demodulator 88′ in a manner such as to maintain equality between the detected outputs of the carrier-exalted demodulator and the detector 306. Since the output of the diode detector 300 more nearly approaches the volume variation of the original transmitted signal, an improved volume range is obtained.

The controlled amplifier 29 in Fig. 2 amplifies the unfiltered signal energy which is fed to the carrier-exalted demodulator. The application of control potential to an amplifier which amplifies the modulated carrier wave energy, as is true of amplifier 29, has the advantage that less distortion is produced by the required variations in gain. If the control potential were applied to the detected voltage, there is the possibility of introducing harmonic distortion due to the required variation of bias. This harmonic distortion falls in the audio range, and is harmful. When the controlled amplifier amplifies the modulated wave, the harmonic distortion that is produced is a harmonic of the carrier frequency of the modulated wave. This harmonic is removed by frequency selection. The result is not a complete elimination of the possibility of distortion, but a reduced possibility of production.

In Fig. 3 I have shown how the control potential, which is the differential voltage of the rectified voltages across resistors 314 and 315, would be applied to a controlled amplifier which functions to amplify the output of the carrier-exalted detector 88′. It will be noted that the circuits of Fig. 3 are substantially the same as those of Fig. 2, except for the fact that the differential voltage of the rectifiers 311 and 313 is applied over lead 318 to the audio frequency amplifier 110. The audio frequency amplifier 110 is provided with an input plug 324 adapted to be inserted into the output terminals 319 of the carrier-exalted detector 88′. The volume-controlled amplifier 110 may have the control potential, delivered thereto over lead 318, applied to a signal grid thereof, just as is shown in connection with the control lead 120 and signal grid 100 in the case of Fig. 1. The modification of Fig. 3 has the advantage that the volume-controlled equipment may be made in one unit which is fed by the respective outputs of detectors 88′ and 300.

In the modification of Fig. 4 I have shown how the control potential over lead 318 may be fed to a controlled amplifier 110 which is itself not in the circuit of the voltage fed to the rectifiers. This modification is different from that of Fig. 3 in that the control is not in the form of a feedback control voltage, but is rather in the form of a control on a separate amplifier which is independent of the voltage fed to the rectifiers. In other words, the lead 305 to the resistor 314 would be connected to the center tap of the secondary winding of an audio transformer whose primary winding would be fed from a point in the audio frequency output circuit of carrier-exalted demodulator 88′ ahead of the controlled audio frequency amplifier 110. The lead 306 would be connected in the same manner as shown in Fig. 3. When the control is applied in the manner shown in Fig. 4, the decrease of control may be carried to such an extent that over-control is obtained. This high degree of control may not be obtained by the circuits using the feedback control, but the feedback control circuits may be somewhat more stable.

While I have indicated and described several systems for carrying my invention into effect, it will be apparent to one skilled in the art that my invention is by no means limited to the particular circuit organizations shown and described, but that many modifications may be made without departing from the scope of my invention.

What I claim is:

In a carrier-exalted receiving system, means for amplifying collected modulated carrier waves subject to selective fading, selective means for removing substantially all of the modulation from the carrier waves to provide substantially pure carrier energy, discriminator means coupled to the output of said selective means and to the output of said amplifying means to provide a frequency control bias in response to a shift in carrier frequency from a predetermined reference frequency and within a predetermined range, means coupled to the output of said selective means for limiting the amplitude of said pure carrier energy, a demodulator for combining the amplified modulated carrier waves with said limited carrier energy to provide demodulation of said modulated carrier waves, an electronic reactance device responsive to said frequency control bias for controlling the frequency of said amplified modulated carrier waves, a two-phase-motor-driven condenser device for controlling the frequency of said amplified modulated waves, a common source of alternating current supplying the two phases of motor-energizing current, said frequency control bias controlling the amplitude of one of said two phases of current, and means, responsive to a predetermined decrease of filtered carrier energy at said limiting means, for rendering at least one of said frequency controlling devices ineffective.

MURRAY G. CROSBY.

REFERENCES CITED

The following references are of record in the file of this patent:

UNITED STATES PATENTS

| Number | Name | Date |
|---|---|---|
| 2,041,855 | Ohl | May 26, 1936 |
| 2,123,716 | Crosby | July 12, 1938 |
| 2,138,746 | Robinson | Nov. 29, 1938 |
| 2,144,605 | Biers | Jan. 24, 1939 |
| 2,173,902 | Gerth et al. | Sept. 26, 1939 |
| 2,200,037 | Mountjoy et al. | May 7, 1940 |
| 2,200,062 | Groenveld | May 7, 1940 |
| 2,209,330 | Haffcke | July 30, 1940 |
| 2,214,613 | Herold | Sept. 10, 1940 |
| 2,221,087 | Foster | Nov. 12, 1940 |
| 2,226,366 | Braden | Dec. 24, 1940 |
| 2,231,386 | Jackson | Feb. 11, 1941 |
| 2,232,390 | Katzin | Feb. 18, 1941 |
| 2,236,497 | Beers | Apr. 1, 1941 |
| 2,240,428 | Travis | Apr. 29, 1941 |
| 2,246,688 | Kircher | June 24, 1941 |
| 2,250,519 | Beers | July 29, 1941 |
| 2,273,098 | Foster | Feb. 17, 1942 |
| 2,286,410 | Harris | June 16, 1942 |
| 2,294,182 | Hintz | Aug. 25, 1942 |
| 2,333,990 | Dome | Nov. 9, 1943 |
| 2,341,936 | Maynard | Feb. 15, 1944 |
| 2,389,919 | Mathews | Nov. 27, 1945 |
| 2,404,852 | Koch | July 30, 1946 |
| 2,410,817 | Ginzton et al. | Nov. 12, 1946 |